United States Patent [19]
Kirstein

[11] Patent Number: 4,850,249
[45] Date of Patent: Jul. 25, 1989

[54] AUTOMATED CONTROL SYSTEM FOR TRACTION VEHICLES

[75] Inventor: Gerhard Kirstein, Augsburg, Fed. Rep. of Germany

[73] Assignee: Renk Aktiengesellschaft, Augsburg, Fed. Rep. of Germany

[21] Appl. No.: 149,851

[22] Filed: Jan. 29, 1988

[30] Foreign Application Priority Data

Feb. 4, 1987 [DE] Fed. Rep. of Germany ....... 3703234

[51] Int. Cl.⁴ ............................................. B60K 41/02
[52] U.S. Cl. ....................................... 74/844; 74/866; 74/856; 74/845; 74/878
[58] Field of Search ................. 74/866, 862, 861, 856, 74/845, 844, 878; 180/14.6, 290; 364/424.1

[56] References Cited

U.S. PATENT DOCUMENTS

| | | | |
|---|---|---|---|
| 4,198,882 | 4/1980 | Kiencke et al. ........................ | 74/866 |
| 4,517,646 | 5/1985 | Magnusson et al. ............. | 74/866 X |
| 4,630,508 | 12/1986 | Klatt ............................. | 364/424.1 X |
| 4,658,676 | 4/1987 | Furusawa et al. ........... | 364/424.1 X |
| 4,662,491 | 5/1987 | Takefuta et al. ............. | 192/0.076 X |
| 4,665,773 | 5/1987 | Hiramatsu et al. .................... | 74/866 |
| 4,690,239 | 9/1987 | Takahashi et al. ........... | 364/424.1 X |
| 4,693,142 | 9/1987 | Kurihara et al. .................. | 74/878 X |

FOREIGN PATENT DOCUMENTS

2952204 6/1981 Fed. Rep. of Germany .
3314800 10/1984 Fed. Rep. of Germany .
3610461 10/1986 Fed. Rep. of Germany .

OTHER PUBLICATIONS

Automobil-Industrie 6/86 pp. 743-748.

*Primary Examiner*—Leslie A. Braun
*Assistant Examiner*—William Gehris
*Attorney, Agent, or Firm*—Natter & Natter

[57] ABSTRACT

A control system is provided for a traction vehicle having a coupling for towing a trailing vehicle load. The system includes a microprocessor which receives signals from a load sensor and, as a function of such signals, controls the slip duration of shifting clutches in an automatic gear shift mechanism as well as the gear speed ratio timing and shifting sequence. In addition, the control system limits the minimum turn radius of the traction vehicle when pulling a load and prevents excessive acceleration of the traction vehicle when not coupled to a load.

11 Claims, 1 Drawing Sheet

AUTOMATED CONTROL SYSTEM FOR TRACTION VEHICLES

BACKGROUND OF THE INVENTION

1. Field of the Invention

The invention relates generally to control systems for load pulling vehicles and more particularly to a control system for an automatic gear shift mechanism of a traction vehicle.

2. Related Art

In addition to the ordinary requirements of safe driving and mechanical vehicle operation, drivers of traction vehicles, such as tractor trailer combinations, were constantly faced with changing circumstances affecting vehicle handling, operation and response, all related to the type and nature of a trailing vehicle load. Trailing vehicle loads caused changes in the traction vehicle handling and operating characteristics including engine performance, and transmission performance. Such loads, for example, required the traction vehicle driver to employ longer duration engagement of lower gear ratios as a function of the load characteristics.

The pulling of loads by traction vehicles resulted in increased engine wear engine load and increased rate of clutch wear when starting and during speed change gear shifts.

Further, the size and configuration of a trailing vehicle load mandated special steering considerations such as wider turn radii. The vehicle operator was required to always be cognizant of whether a trailing vehicle load was connected, the size of the load, the load configuration and other factors all of which were subject to change.

Such factors greatly affected the manner in which the traction vehicle was to be operated by the operator and placed increase demands on drivers who were often subject to extended working hours, especially long haul tractor trailer drivers.

Increased demands were also placed upon tracked vehicle operators when a vehicle was pulling a load. For example, a tank operator pulling a trailing vehicle was required to be concerned about not only battle conditions but, in addition, due to limited visibility and the like, had to be concerned with terrain variations and persons in the vicinity of the traction and trailing vehicles and the greatly altered driving characteristics of the traction vehicle.

German patent document DE-OS No. 29 52 204 illustrated an attempt to provide a controller for a gear shift mechanism to control gear shifts into higher or lower gear as a function of a trailing vehicle load. Such controller was apparently designed for the purpose of reducing fuel consumption and was not capable of assuring that the traction vehicle operating characteristics would be similar whether or not it was pulling a load.

In German patent document DE-OS No. 33 14 800, a gear shift mechanism controller was disclosed. The controller operated as a function of instantaneous engine driving torque and vehicle acceleration. The controller was incapable, however, of detecting whether a trailing vehicle was being pulled by the traction vehicle and altering shift patterns as a result. In the magazine *Automobil-Industrie,* No. 6/86 pp. 743–748, an electropneumatic gear shift for a multi-speed mechanical utility vehicle transmission was disclosed to include visual indicators for displaying both vehicle speed and the shifted gear which was in engagement.

Attention is also directed to German patent document DE-OS No. 36 10 461 which disclosed a device for steering both the front and rear wheels of a motor vehicle. The device included means for detecting a vehicle load on the rear wheel axle and as a function of such load, changing the ratio of the steering angle of the rear wheels relative to the steering angle of the front wheels.

SUMMARY OF THE INVENTION

In compendium, the invention comprises a control system for a traction vehicle with the vehicle including a coupling for selectively engaging a trailing vehicle load. The control system includes a microprocessor which controls an automatic speed change gear shift mechanism. The microprocessor is programmed with several shift patterns.

A sensor is provided for detecting a trailing vehicle load with the sensor being coupled to the microprocessor. The microprocessor automatically selects a shift pattern and shifts gears as a function of the detected trailing vehicle load. In addition it controls slip duration (time) of the shifting clutches in the gear shift mechanism as a function of the detected trailing vehicle load to reduce clutch wear.

The minimum turn radius of the traction vehicle is automatically limited by the microprocessor as a function of the detected load. In addition, the microprocessor prevents excessive acceleration of the traction vehicle as may occur when no load is coupled by automatically shifting to a higher gear ratio and preventing downshifting.

From the forgoing summary, it will be appreciated that it is a consideration of the present invention to provide an automated control system for traction vehicles of the general character described which, however, is not subject to the disadvantages of the related art aforementioned.

A further consideration of the present invention is to provide an automated control system for traction vehicles of the general character described which assures approximately identical driving response and safety whether the traction vehicle is or is not coupled to a trailing vehicle load.

An aspect of the present invention is to provide an automated control system for traction vehicles of the general character described which controls the slip time of speed change clutches in an automatic gear shift mechanism as a function of the trailing vehicle load.

A feature of the present invention is to provide an automated control system for traction vehicles of the general character described which automatically limits the minimum steering radius of a traction vehicle as a function of a trailing vehicle load.

A further consideration of the present invention is to provide an automated control system for traction vehicles of the general character described which reduces wear of speed change gearing clutches.

Yet another consideration of the present invention is to provide an automated control system for traction vehicles of the general character described which promotes operating safety and reduces the possibility of driver error.

Another feature of the present invention is to provide an automated control system for traction vehicles of the general character described which prevents inadvertent excessive acceleration of a traction vehicle when a load is not coupled to the vehicle.

Other aspects, features and considerations in part will be obvious and in part will be pointed out hereinafter.

With these ends in view, the invention finds embodiment in the various combinations of elements and arrangements of parts by which the said aspects, features and considerations and certain other aspects, features and considerations are attained, all with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENT

Figure 1:
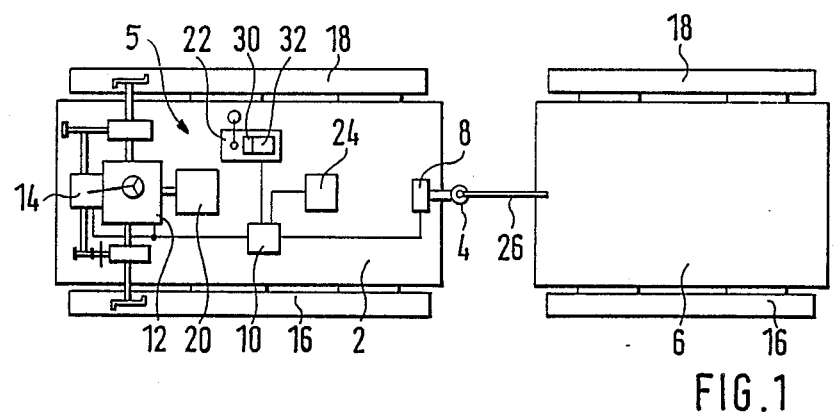
FIG. 1 is a schematized plan view of a traction vehicle and a trailing vehicle coupled thereto, with both vehicles constituting tracked vehicles, e.g. tanks, and with the traction vehicle having an automated control system constructed in accordance with embodying the invention.

Referring now in detail to the drawings, FIG. 1 illustrates a schematized plan view of a traction vehicle 2, comprising a tracked vehicle such as a tank operatively towing a trailing vehicle load 6, also comprising a tracked vehicle such as a tank which includes a right track or chain 18 and a left track or chain 16. Extending from the rear of the traction vehicle 2 is a trailer coupling 4 operatively coupled to a tow rod 26 which interconnects the traction vehicle and the trailing vehicle load 6.

The traction vehicle 2 includes an engine 20, e.g. a diesel engine, coupled to an automatic shiftable under load speed change gear shift mechanism 12 and an integrated steering drive 14, all of conventional design. In a known manner, the automatic speed change gear shift mechanism 12 and the steering drive 14 are simultaneously driven to effect propulsion and steering control over the vehicle 2 by driving gear wheels which engage a right track or chain 18 and a left track or chain 16. Steering control of this type for a tracked vehicle through superimposition of rotation of a neutral shaft on planetary gear sets which drive the tracks or chains is well known.

Pursuant to the invention, a control system 5 is provided which effects automatic control over operation of the automatic speed change mechanism 12 and the steering control 14 as a function of the detected tractive load of a trailing vehicle 6 being towed by the vehicle 2. The control system 5 includes a sensor 8 which is coupled to the trailer coupling 4 and generates a signal indicating the presence of a trailing vehicle load and, in addition, quantitative signals indicative of the value of the trailed load.

A controller 10, which may comprise a conventional microcomputer or microprocessor, receives the signals generated by the sensor 8 and, as a function of such signals, effects automatic control over the speed change gear shift mechanism 12 and the steering control 14.

The controller 10 is programmed with a plurality of gear shift sequence and shift timing patterns and is also programmed to select one or more gear shift programs suitable for the characteristics of the detected vehicle load 6. For example, as a function of the detected trailing vehicle load, the controller 10 may select and control an automatic gear shift program whereby the gear shift mechanism 12 automatically starts in first gear, shifts into second and third gears automatically, and then skips intermediate gears going into fifth gear and seventh gear. Depending upon the anticipated usages, many shifting programs can be carried a memory associated with the controller 10.

In addition, the controller is coupled to a manual shift selector 22. Depending upon the selected shift program which is a function of the trailing vehicle load, the controller may require the vehicle operator to manually select the first and second gears and automatically control the remaining gear stages. Further programs may permit all of the gears to be shifted manually. Additionally, particular load characteristics might require sequential selection and engagement of more than one shift program.

In accordance with the invention, in addition to selection of appropriate shifting patterns as a function of the trailing vehicle load, the controller 10 is programmed to control the clutch slip duration time of the shifting clutches of the gear shift mechanism in order to avoid excessive clutch wear normally encountered when towing a trailing vehicle. Obviously, if the clutch slip duration time is the same for driving a vehicle with and without a trailing vehicle load, the shifting clutches will be subject to excessive wear and overheating when the traction vehicle is pulling a load. The controller 10 reduces shifting clutch slip time when a trailing vehicle load is detected by the sensor 8. Preferably, the clutch slip duration is controlled as a function of the magnitude of the trailing vehicle load, for example, shorter slip time is programmed when a heavier trailing vehicle load is detected than when a lighter vehicle load is detected.

The control system 5 additionally includes an accelerometer 24 which detects the magnitude of acceleration of the traction vehicle 2. The signal generated by the accelerometer is received by the controller 10 which carries a maximum value in a memory. The transmitted value is compared with the maximum value. Upon detection of excessive acceleration due, for example, to the fact that there is no trailing vehicle load, possibly as a result of a broken tow rod, the controller 10 is programmed to switch the speed change gear shift mechanism to a higher gear speed ratio and to block the lower gear speed ratios from being manually engaged.

As previously mentioned, a further factor involved with operation of a traction vehicle when it is pulling a trailing vehicle load is that care is required to avoid a traction vehicle steering radius which is too small for the trailing vehicle load. The controller 10 is programmed to automatically prevent a vehicle operator from setting a curve radius which is smaller than a predetermined minimum radius for towing the trailing vehicle. A sensor is provided to detect the curve radius which is set by the vehicle operator at a steering control. The controller receives a signal from the sensor and disables the steering drive 14 from rotating the neutral shaft to effect a curve radius which is less than a programmed minimum radius for towing the detected load.

The control system 5 additionally includes an indicator 30 such as a display which provides visual indicia of the gear speed actually set at any given time in the automatic gear shift mechanism 12. A further indicator such as a display 32 is also provided for indicating the selected gear shift program of the controller 10. Thus, the vehicle operator is made aware of the status of the speed change gear shift mechanism and can modify his driving technique accordingly.

Figure 2:
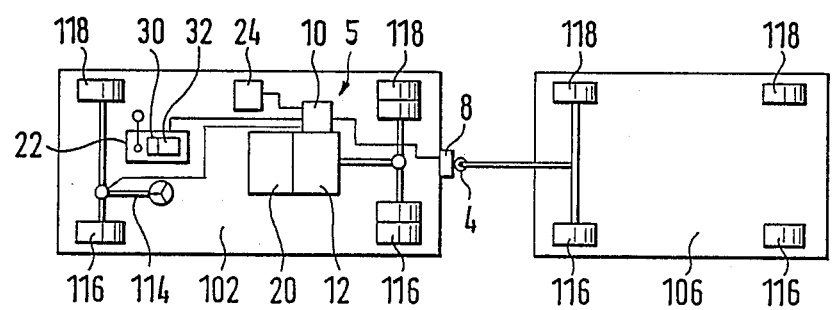
FIG. 2 is a schematized plan view, similar to FIG. 1, of an alternate embodiment of the invention, wherein the traction vehicle comprises a wheeled vehicle, e.g. a truck, and the trailing comprises a wheeled vehicle.

In FIG. 2 an alternate embodiment of the invention is disclosed wherein the traction vehicle comprises a wheeled vehicle such as a truck 102 having sets of right wheels 118 and left wheels 116 with a wheeled trailing vehicle load 106 having sets of right wheels 118 and left wheels 116 coupled through a trailer coupling 4 which includes a sensor 8. The truck 102 includes an engine 20, an automatic gear shift mechanism 12 and a manual steering shaft 14 connected to a steering gear.

In this embodiment, the controller 10 controls the automatic gear shift mechanism 12 in the same manner as it controlled the automatic gear shift mechanism 12 of the prior embodiment, by selecting shift programs with shift timing and sequence patterns and clutch slip duration control as a function of the detected trailing vehicle load. In addition, the controller 10 limits the smallest possible turn radius set in the steering gear of the truck 102 as a function of the trailing vehicle load. This can be achieved by monitoring the actual front wheel angles and disabling the steering gear after a maximum predetermined angle has been reached. In a manner identical to that of the previous embodiment, the controller regulates the automatic gear shift mechanism to avoid excessive acceleration as detected by an accellerometer 24. Thus, the control system of this embodiment functions in a manner substantially identical to that of the previous embodiment.

Figure 3:
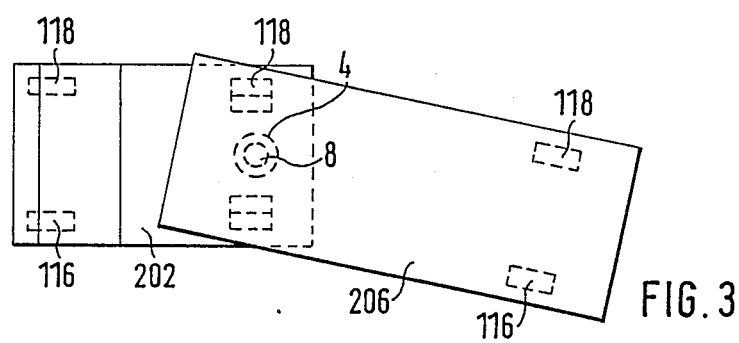
FIG. 3 is a schematized plan view of a still further embodiment of the invention wherein the traction vehicle comprises a tractor and the trailing vehicle load comprises a semi-trailer.

Referring now to FIG. 3, a further embodiment of the invention is disclosed wherein the traction vehicle comprises a tractor 202 and the trailing vehicle comprises a semi-trailer 206. The tractor is equipped with a control system substantially identical to that disclosed with reference to the embodiment of FIG. 2, however, a trailer coupling 4 is of modified configuration and is mounted to a saddle of the tractor 202. Further a modified design sensor 8 suitable for the particular coupling 4 is employed. The remainder of the control system of the FIG. 3 embodiment is substantially identical to that of the FIG. 2 embodiment and is not shown in the FIG. 3 drawing.

Thus, it will be seen that there is provided an automated control system for traction vehicles which achieves the various aspects, features and considerations of the present invention and which is well suited to meet the conditions of practical usage.

As various possible embodiments might be made of the present invention and the various changes might be made in the embodiments set forth, it is to be understood that all matter herein described or shown in the accompanying drawings is to be interpreted as illustrative and not in a limiting sense.

Having thus described the invention there is claimed as new and desired to be secured by Letters Patent:

1. A control system for a traction vehicle having an automatic gear shift mechanism, the gear shift mechanism including a plurality of gears which may be interengaged in a variety of gear speed ratios and a plurality of shifting clutches, the shifting clutches being positionable in a slip mode and in a non-slip mode, the traction vehicle including means for coupling the traction vehicle to a trailing vehicle load, the control system further including means for sensing the trailing vehicle load, the sensing means including means for generating a signal indicative of the trailing vehicle load, the control system further including controller means, the controller means including means for receiving the trailing vehicle load signal and in response thereto, controlling the duration of the slip mode of the shifting clutches and changing the gear speed ratio of the gear shift mechanism as a function of the trailing vehicle load signal.

2. A control system for a traction vehicle as constructed in accordance with claim 1, the vehicle including steering means for direction control, the controller means including means for limiting the minimum turn radius of the vehicle as a function of the trailing vehicle load signal.

3. A control system for a traction vehicle as constructed in accordance with claim 1 wherein the controller means includes means for varying shift timing patterns of the gear shift mechanism as a function of the trailing vehicle load signal.

4. A control system for a traction vehicle having an automatic gear shift mechanism, the gear shift mechanism including a plurality of gears setable in a variety of gear speed ratios and a plurality of shifting clutches, the shifting clutches being positionable in a slip mode and in a non-slip mode, the traction vehicle including means for coupling the traction vehicle to a trailing vehicle load, the control system including means for sensing the trailing vehicle load, the sensing means including means for generating a signal indicative the trailing vehicle load, the control system further including controller means, the controller means comprising a microprocessor, the microprocessor including memory means, the memory means carrying several gear speed shift programs, the programs including gear shift sequence patterns and gear speed ratio timing patterns, the controller means receiving the trailing vehicle load signal and in response thereto selecting a gear shift program, changing the gear speed ratios of the gear shift mechanism, controlling the duration of the slip mode of the shifting clutches and varying the gear speed ratio timing patterns as a function of the trailing vehicle load signal, the control system further including means for sensing traction vehicle acceleration, the acceleration sensing means generating a signal indicative of traction vehicle acceleration, the controller means further including means for receiving the signal indicative of traction vehicle acceleration, comparing the traction vehicle acceleration signal with a stored value and, if the signal indicative of traction vehicle acceleration is greater than the stored value, reducing traction vehicle acceleration by controlling the gear shift mechanism to shift into a higher gear speed ratio.

5. A control system for a traction vehicle as constructed in accordance with claim 4, the vehicle including steering means for direction control, the controller means including means for limiting the minimum turn radius of the vehicle as a function of the trailing vehicle load signal.

6. A control system for a traction vehicle as constructed in accordance with claim 4 wherein the controller means further includes means for preventing the gear shift mechanism from shifting into a lower gear speed ratio when the acceleration indicative signal exceeds the stored value signal.

7. A control system for a traction vehicle as constructed in accordance with claim 4 further including means for visually indicating the gear speed ratio engaged in the gear shift mechanism and means for visually indicating the gear shift sequence pattern selected by the controller means.

8. A control system for a traction vehicle having an automatic gear shift mechanism, the gear shift mechanism including a plurality of interengageable gears setable in a variety of gear speed ratios, the gear shift mechanism further including shifting clutches, the shifting clutches being positionable in a slip mode and in a nonslip mode, the traction vehicle including means for coupling the traction vehicle to a trailing vehicle load, the control system including means for sensing the trailing vehicle load, the sensing means including means for generating a signal indicative of the trailing vehicle load, the control system further including controller means, the controller means including means for storing a plurality of gear shift sequence patterns, the controller means including means for receiving the trailing vehicle load signal and in response thereto, selecting a gear shift sequence pattern, changing the gear speed ratios of the gear shift mechanism and controlling the duration of the slip mode of the shifting clutches as a function of the trailing vehicle load signal, the control system further including means for visually indicating the instantaneous gear speed ratio presently engaged and means for visually indicating the gear shift sequence pattern selected by the controller means.

9. A control system for a traction vehicle as constructed in accordance with claim 8, the vehicle including steering means for direction control, the controller means including means for limiting the minimum turn radius of the vehicle as a function of the trailing vehicle load signal.

10. A method of controlling a traction vehicle having an automatic gear shift mechanism and which vehicle is selectively coupled to a trailing vehicle load, the automatic gear shift mechanism including automatic shifting clutches, the method comprising the steps:

(a) storing a plurality of shift programs having shift timing patterns and shift sequence patterns in a memory, (b) detecting the presence of a trailing vehicle load, (c) selecting a shift program compatible with the detected load, (d) controlling the slip duration of the shifting clutches as a function of the detected load, (e) storing a maximum acceleration value in a memory, (f) monitoring acceleration of the traction vehicle, (g) determining if the monitored acceleration exceeds the stored value, and (h) reducing the acceleration of the traction vehicle when the monitored acceleration exceeds the stored value by engaging a higher gear speed ratio in the gear shift mechanism, (i) blocking the gear shift mechanism from engaging a lower gear speed ratio after the higher gear speed ratio has been engaged, and (j) preventing the traction vehicle from making turns having a radius smaller than a predetermined value in the presence of a detected load.

11. A method of controlling a traction vehicle in accordance with claim 10 wherein the vehicle comprises a tracked vehicle having an integrated steering drive wherein the step of preventing the traction vehicle from making turns having a radius smaller than the predetermined value includes the step of disabling the steering drive.

* * * * *